INVENTORS.
MARSHALL W. BAKER,
HAL C. JOHNSTON, AND
CHARLES F. HENNEY.

INVENTORS
MARSHALL W. BAKER,
HAL C. JOHNSTON, AND
CHARLES F. HENNEY.

2,773,360

VEHICLE REFRIGERATING APPARATUS

Marshall W. Baker, Hal C. Johnston, and Charles F. Henney, Dayton, Ohio, assignors to General Motors Corporation, Dayton, Ohio, a corporation of Delaware Application January 16, 1952, Serial No. 266,718

1 Claim. (Cl. 62—117)

This invention relates to refrigerating apparatus and more particularly to apparatus for conditioning the air for the passenger compartment of an automobile or the like.

It is an object of this invention to provide a compact and efficient air conditioning system which may be installed in a conventional passenger automobile without materially altering the existing construction of the automobile.

Another object of this invention is to provide improved means for controlling the output of the air conditioning system so as to compensate for changes in the car engine speed as well as changes in the cooling requirements.

Still another object of this invention is to provide a system which allows one to operate the compressor continuously without danger of overheating the compressor when no appreciable amount of cold refrigerant vapor is being returned to the compressor from the evaporator. More particularly it is an object of this invention to provide a compressor by-pass arrangement which makes it necessary to circulate all of the by-passed refrigerant through the condenser before returning it to the compressor.

A further object of this invention is to provide a supplemental control for regulating the air temperature which comprises a heating coil in the path of the air flowing over the evaporator so as to reheat the air when the air conditioning system has excess capacity or when no cooling whatsoever is required but the relative humidity of the air in the passenger compartment of the car becomes excessive so as to require dehumidification only.

Further objects and advantages of the present invention will be apparent from the following description, reference being had to the accompanying drawings wherein a preferred form of the invention is clearly shown.

Figure 1:
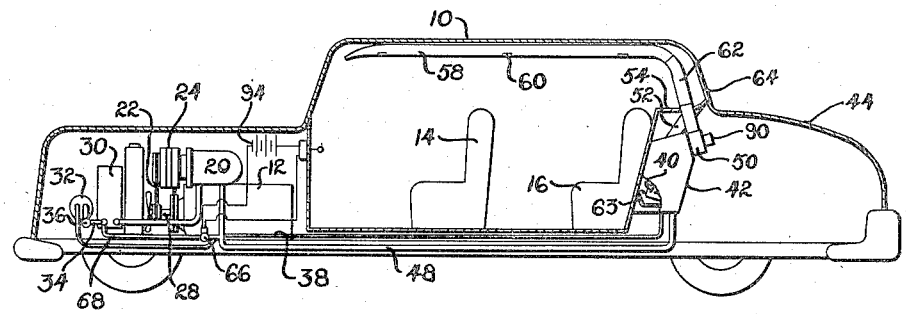
Fig. 1 is a side view somewhat schematic of an automobile equipped with an air conditioning system embodying the present invention.
Figure 3:
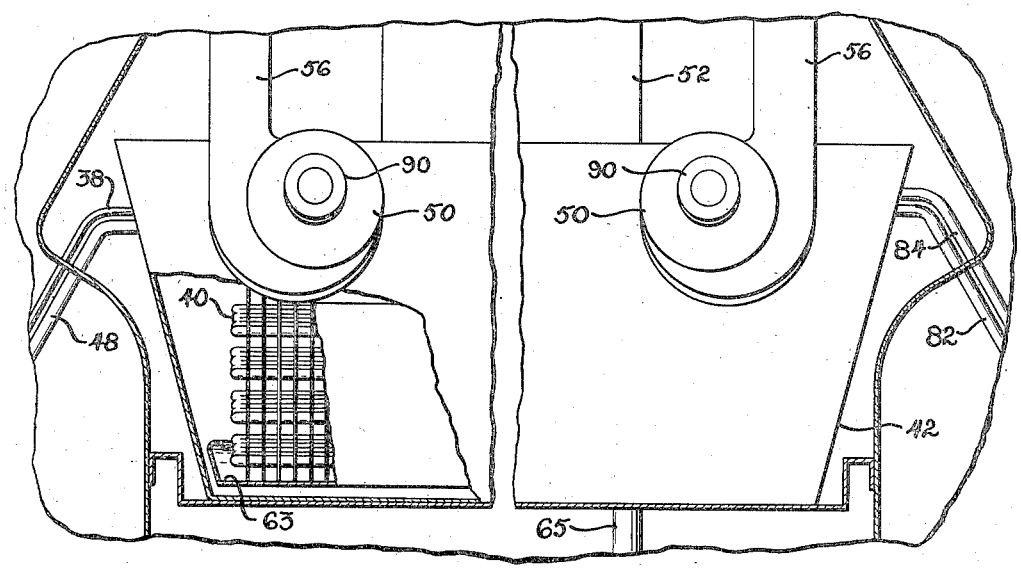
Fig. 3 is a fragmentary elevational view with parts broken away showing the arrangement of the cooling coil and the reheat coil.

Referring now to Fig. 1 of the drawings wherein I have shown a preferred embodiment of my invention, reference numeral 10 designates an automobile having an engine 12 mounted in the engine compartment thereof and having front and rear seats 14 and 16 respectively disposed within the passenger compartment. The air conditioning equipment comprises a refrigerant compressor 20 and a condenser 30 both supported directly within the engine compartment of the car as shown and an evaporator 40 located in the usual baggage compartment of the car.

The compressor 20 is adapted to be driven from the main engine 12 by means of a V-belt 22 which drives the compressor through a magnetic type of clutch 24. This clutch serves to vary the speed ratio between the car engine and the compressor and may be the well-known Eaton type of magnetic clutch wherein at slow speeds there is little or no slippage between the compressor operating shaft 26 and the crankshaft 28, but as the speed of the compressor begins to exceed some predetermined value such as 2800 R. P. M. the slippage begins to increase with the result that the car engine speed may increase materially without appreciably increasing the speed of the compressor beyond the 2800 R. P. M. speed. Since clutches of this type are well known in the art and since the detailed construction of the clutch per se does not form a part of the present invention, it will not be described in greater detail. Insofar as certain aspects of the inventions are concerned, any other well-known type of compressor driving arrangement could be used.

The refrigerant circuit includes the condenser 30 into which the compressed refrigerant leaving the compressor is at all times discharged. The condensed refrigerant flows from the condenser 30 into a receiver 32 via the refrigerant line 34 in which there is provided a check valve 36 which allows the free flow of refrigerant into the receiver for a purpose to be explained more fully hereinafter. A liquid line 38 is provided as shown for conveying liquid refrigerant from the receiver 32 into the evaporator 40 which is mounted within the cabinet 42 located in the trunk compartment 44 of the car. A conventional thermostatic expansion valve 46 regulates the flow of liquid refrigerant from the receiver 32 into the evaporator 40 in accordance with well-known practice. The vaporized refrigerant returns to the compressor through the vapor line 48.

Figure 2:
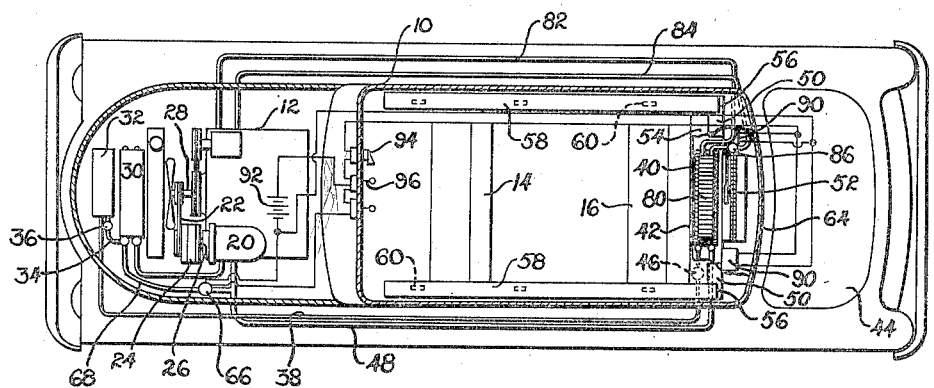
Fig. 2 is a plan view somewhat schematic showing the location of various parts within the automobile.

The air to be conditioned is circulated in thermal exchange relationship with the evaporator coil 40 by means of a pair of variable speed fans 50. These fans serve to withdraw air from the passenger compartment through an air grill 52 located on the central portion of the package shelf or ledge 54 and serve then to pull the air through the cabinet 42 in which the evaporator is located before discharging the cooled air into a pair of air ducts 56 which are arranged as shown. These air ducts include horizontal sections 58 which extend towards the front of the car along the ceiling as shown in Figs. 1 and 2. These horizontal sections are provided with perforations 60 which serve to discharge the air into the passenger compartment. In order to avoid any obstruction to the driver's vision, each of these air ducts is provided with a transparent portion 62 at the point where these ducts pass the rear window 64.

Figure 4:
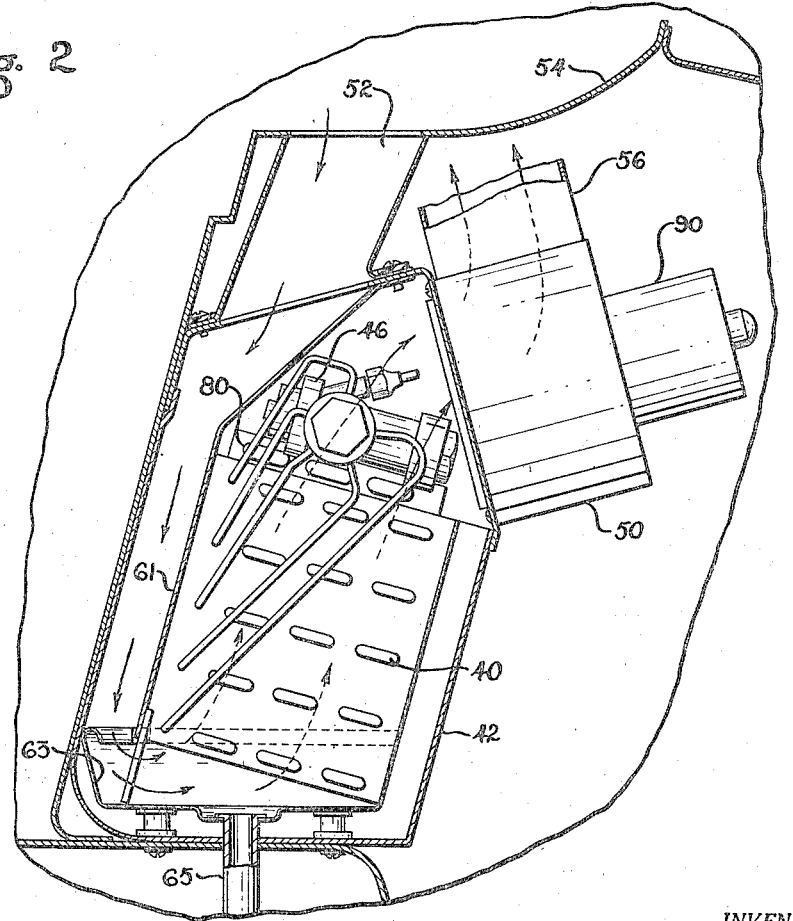
Fig. 4 is an elevational view with parts broken away showing the one end of the mechanism disclosed in Fig. 3.

The evaporator 40 is mounted within the casing or cabinet 42 as best shown in Fig. 4. A baffle 61 which extends from the package shelf 54 to the bottom of the evaporator separates the return air stream from the air flowing upwardly through the evaporator 40 as shown by the arrows. A condensate collecting pan 63 is provided beneath the evaporator 40 and is provided with a drain 65.

The air cooling system may be rendered ineffective by opening the valve 66 which is located in a by-pass line 68 as shown in Figs. 1 and 2. It will be noted that this by-pass line serves to connect the outlet of the condenser with the inlet or suction line of the compressor with the result that any refrigerant recirculated through the compressor will have been cooled before being returned to the compressor. This is an important feature in an automobile air conditioning system wherein the compressor operates continuously even though no cooling is required. In any type of system the compressor is normally cooled by the cold refrigerant vapor returning to the compressor from the evaporator but the cooling effect of this vapor is cut off when the evaporator is by-passed such as by opening of the valve 66. It is recognized that it is notoriously old to provide a by-pass for unloading a compressor but such by-passes are usually so arranged that the refrigerant which is by-passed flows directly from the compressor outlet to the compressor inlet without being cooled with the result that the by-passed refrigerant is incapable of cooling the compressor.

Since there are times when one wishes to provide a small amount of cooling rather than shutting off the system completely, there is provided a reheat coil 80 directly above the evaporator 40 whereby it is possible to reheat the air leaving the evaporator. This reheat coil 80 is adapted to be connected in the engine cooling system by means of the pipes 82 and 84 which are adapted to be connected into the engine cooling system the same as any conventional hot water car heater is connected into the cooling system. The amount of reheat is preferably controlled by a thermostatically controlled throttle valve 86 located in the line 84. The thermostat for controlling the valve 86 may be located in any suitable place such as in the passenger compartment of the car or directly behind the air grill 52 as shown. The reheat coil 80 can also be used for supplying heat during cold seasons.

The fan means for use in circulating the air to be conditioned includes a pair of variable speed fan motors 90 which are adapted to be energized from the car battery 92 through the speed regulating rheostat 94 and the ignition switch 96. The arrangement is such that the fan motors 90 will not be energized until the ignition switch 96 has been closed.

While the form of embodiment of the invention as herein disclosed constitutes a preferred form, it is to be understood that other forms might be adopted as may come within the scope of the claim which follows.

What is claimed is as follows:

In combination, a compressor, a variable speed power source for said compressor, a condenser, an evaporator, a receiver, refrigerant flow connections between said compressor, condenser, receiver and evaporator, said connections including a check valve between said condenser and said receiver, and a by-pass connecting the inlet of said compressor to said fluid flow means at a point between said condenser and said check valve whereby refrigerant may be circulated between said compressor and said condenser without passing through said receiver and said evaporator.

References Cited in the file of this patent
UNITED STATES PATENTS

| | | |
|---|---|---|
| 1,668,490 | Caesar | May 1, 1928 |
| 2,022,333 | Woolley | Nov. 26, 1935 |
| 2,170,991 | Grady | Aug. 29, 1939 |
| 2,180,760 | Mayo | Nov. 21, 1939 |
| 2,181,053 | Hamilton | Nov. 21, 1939 |
| 2,206,631 | Clark | July 2, 1940 |
| 2,311,622 | Alexander et al. | Feb. 23, 1943 |
| 2,341,781 | Hornaday | Feb. 15, 1944 |
| 2,355,040 | Alexander et al. | Aug. 8, 1944 |
| 2,520,674 | Buschmann | Aug. 29, 1950 |
| 2,561,876 | Leonard | July 24, 1951 |
| 2,569,009 | Kuempel | Sept. 25, 1951 |
| 2,621,487 | Warren | Dec. 16, 1952 |